Patented Jan. 30, 1940

2,188,331

UNITED STATES PATENT OFFICE 2,188,331

PAPER CARRIER SHEET FOR TACKY RUBBER, AND PROCESS OF MAKING SAME

George W. Coggeshall, Yarmouth, Maine, assignor to S. D. Warren Company, Boston, Mass., a corporation of Massachusetts No Drawing. Application July 16, 1936, Serial No. 90,993

9 Claims. (Cl. 91—68)

This invention relates to a process of making a strong, tough, non-splitting, non-adhesive paper sheet having properties adapting it for use as a carrier for tacky rubber in the rubber industry; also, to the product of that process.

According to the present invention, I make a strong and tough paper sheet having a smooth and dense surface from which tacky sheet rubber will easily separate clean and glossy with no impairment of its surface, with its full tackiness, and without material "picking". The process by which this product is produced comprises, in general, preparing a strong and tough "non-splitting" web (e. g., paper web), impregnating and/or coating the web with suitable compositions and calendering, and finally surfacing the sheet with a suitable "lacquering" composition.

The properties of the new product will, hereinafter, be described with reference to one following particular use of the same in the rubber industry. In preparing a rubber patch material a special rubber mass is sheeted onto a web of my specially prepared paper material by squeezing rubber "gum", containing no vulcanizing agents, onto the latter as it passes between two rolls of the rubber-calendering machine, a layer of predetermined thickness of the "gum" being carried down on the upper, heated, roll of the pair to the point where the layer meets the paper whereupon the hot "gum" layer is forcibly transferred to the latter. Thereafter, and by a similar operation, a layer (usually much thicker) of rubber mix containing vulcanizing ingredients is applied on top of the tacky rubber layer. When the resulting laminated product is subjected to vulcanizing conditions (i. e., heated in an oven to a relatively high temperature) the outer, thicker, layer of rubber mix is vulcanized or "cured" while the rubber layer next to the paper remains unvulcanized and tacky (and therefore able to adhere well to another surface when the protecting layer of paper is removed, at the time of use of the patch). In the course of manufacture, it is customary to roll the partly fabricated, or completely fabricated, laminated article on itself and later unroll it; accordingly, both sides of the paper should be finished alike and be equally capable of separating easily from rubber, without "picking". Considerable strain is put upon the paper in such rolling and unrolling, during the "curing" of the rubber, and at the time of eventual use: consequently, the paper must be strong, tough and non-splitting.

Hitherto, it has been considered necessary to use as the carrying, separating and protecting layer of a laminated rubber patch article a specially woven and prepared textile material, which is a strong cloth, generally white in color, having a filled construction and a glossy finish. This specially prepared cloth generally is not damaged or discolored during the fabrication of the laminated article (e. g., in the "curing" operation), and it may easily be parted from the adjacent tacky rubber without considerable "picking" of the material with which the cloth is filled. The prepared cloth is, however, somewhat objectionable on the ground of "picking". But the most objectionable feature of the cloth is its high cost.

Because of the high cost of the above-described cloth many prior investigators have attempted (fruitlessly, so far as I am aware) to produce an operable paper substitute therefor. These prior attempts failed for one or another of the following reasons: the paper products were not strong enough to undergo the machine operations in the rubber factories without tearing or splitting; the surfaces of the papers were not of such a composition and/or physical condition that would allow the rubber and paper to be cleanly and easily separated at a later time or after having been in the curing oven: the paper was stained by oil or other materials in the rubber mixture; and the rubber sheet, when separated from the paper, lost some of its original tackiness and luster.

1. For the basis of the new product, I lay up a paper web from a strong stuff (e. g., sulphate or kraft pulp, preferably bleached) which has been beaten only moderately (say, for one-half hour), with only slight hydration, well felting the fibers on the machine. A representative weight of sheet is about 87 pounds per ream (24 x 36—480). At this stage, the sheet should have a Mullen test of from 85 to 90. No filler or engine size is used: consequently, the resulting web, while being well formed, is absorbent.

2. As the next step, I impregnate the web with a suitable impregnating agent or agents. This operation either (a) may be integrated with the normal drying of the web, as by passing the partially dried web through a suitable impregnating bath and then concluding the drying operation, or (b) may be practiced on the already dried web. In either event, the web is subjected to the liquid impregnating composition, excess liquid is removed, and the web is at once dried (e. g., on the customary drying rolls): the web may or may not be then given a light stack calendering.

The impregnation treatment serves to increase the strength and toughness of the web; moreover, it imparts to the latter a greatly increased resistance to splitting. Certain specific impregnating compositions are described hereinafter.

A representative increase in weight due to the impregnating step is 7 pounds per ream, the sheet then weighing about 94 pounds. The Mullen test has been increased to 120 or over. The paper is extremely tough and flexible, and has a split test value of 400 grams or greater.

3. The so-impregnated sheet is then treated to improve its smoothness, surface flatness and firmness, and gloss. This involves super-calendering. While these desiderata may be satisfied merely by (a) super-calendering to a high finish, I prefer to (b) give the web, preliminary to the super-calendering, a surface-impregnating coating with a suitable fluid paper-coating composition, because thereby I am enabled to obtain a smoother and firmer surface and one which, upon the subsequent calendering, will have a flatter lay and take a higher gloss. This surface-impregnating coating operation, where resorted to, may make use of one or another of various compositions generally including pigments and adhesives, with or without modifying agents, two such compositions being described hereinafter. The composition, which may contain little or even no pigment in specific circumstances, is applied to both sides of the web, and the so-coated web is then dried and super-calendered to a high smoothness and gloss.

When resorting to the above-described surface-impregnating coating, I prefer so to adjust the application that the dried sheet increases in weight about 5 pounds per ream (i. e., total weight about 99 pounds). The Mullen test is 120 or over, and the split test is 400 or greater.

4. I now give the sheet (altered and prepared as above described) a final surface coating, on both sides, with a lacquer composition consisting essentially of a plasticized cellulosic ester or ether and/or tough film-forming resins such, for example, as vinyl resins, acryl resins, and the like. The lacquer is applied to the sheet by any suitable continuous process, such as: dipping in a bath and squeezing between squeeze rolls, with or without the use of smoothing rolls or blades; or spreading directly by the aid of doctor blades; or spraying. The lacquer coating is then dried (e. g., in a hot air drier).

While I prefer to surface-coat both sides of the sheet, it is within the scope of this invention to so treat but one side of the sheet.

Whatever the method of application of the lacquer, I prefer so to adjust the application that thereby the weight of the sheet is increased by from about 4 to about 5 pounds per ream, i. e., to a total weight of about 103 to 105 pounds when a surface-impregnating coating was used (or about 98 to 99 pounds when the latter was omitted). Such a sheet weighs about 0.3 to 0.32 pound per square yard, single sheet, and will gauge about 0.005 to 0.006 inch in thickness.

For the impregnating bath of step 2 above I use a water "solution" of glue, casein, starch or equivalent: in some cases casein is preferred. The casein solution is prepared by dissolving, with moderate or no heating, swelled casein in water containing an alkaline dissolving assistant, such as ammonia, borax, or the like. After cooling, I add glycerin and, while vigorously stirring, commercial aqueous formaldehyde solution. Preferably I add enough of the formaldehyde solution to make the composition substantially non-alkaline to slightly acid. This has the result of reducing the viscosity of the bath, making the same sufficiently "thin" to penetrate the paper readily and in quantity sufficient to produce the desired strengthening and toughening effects. I may omit the formaldehyde and use the simple alkaline casein solution. A representative formula for the formaldehyde-casein solution is:

| | Per cent |
|---|---|
| Dry casein | 8.0 |
| Concentrated NH$_4$OH solution | 0.5 |
| 40% commercial formaldehyde solution | 1.0 |
| Glycerin | 2.0 |
| Water | 88.5 |

Control of the amount of impregnating agent added to the paper web is effected by manipulation of the concentration and temperature of the bath, time of immersion, locations of the dip and other guide rolls in the bath, speed of web movement, pressure of the squeeze rolls through which the impregnated sheet passes on its way to the driers, control of the viscosity of the bath, etc.

The solution is about 12 inches deep in a vat. The vat is wider than the sheet and about 8 feet long. The sheet from a roll continuously enters the solution near one end of the vat, passes under a submerged dip-roll near the bottom of the vat, then passes over a submerged roll near the surface of the solution, under another low dip roll, up over another roll near the surface, down under a final low dip-roll, then out of the vat, to squeeze-rolls where excess solution is removed. Bending the paper in the solution makes for better penetration. The sheet running from 125 to 150 feet per minute gives the time of immersion about $\frac{1}{10}$ minute. The solution is at room temperature. The squeeze rolls are about 16 inches in diameter, and the top roll is hard-rubber covered. Its weight can be altered but usually the pressure on the wet sheet is about 25 pounds per inch of sheet width. The sheet passes directly to a conventional series of drying drums such as is used on paper-making machines, and through a stack nip and wound up.

When I use the casein in an alkaline solution, the viscosity of the solution is somewhat greater, yet its use is operable and the impregnating conditions may be altered so that the same amount is introduced into the sheet.

While, as above noted, I prefer, in some cases, to use a casein impregnating bath, the following has been found operable:

| | Per cent |
|---|---|
| Modified starch | 7.0 |
| Glycerin | .07 |
| Water | 92.3 |

This starch bath is more viscous than is the casein bath; consequently, it is more difficult to apply the desired amount (i. e., 7 pounds per ream, more or less). A re-impregnation sometimes is necessary with the starch bath.

When the impregnated web is to be given the surface-impregnating coating alluded to in 3

(b) above, the composition therefor may contain an adhesive such as casein or starch and a flexibilizer, e. g. glycerin, and more or less pigment such as clay, titanium oxide, blanc fixe, and the like, with or without tinting color. Either of the following formulas is useful:

|  | I | II |
| --- | --- | --- |
|  | Parts by weight | Parts by weight |
| Clay | 74.7 | 68.0 |
| Titanium oxide | 10.0 | 10.0 |
| Glycerin | 1.3 | 2.0 |
| Casein | 13.0 |  |
| Aqueous ammonia | 1.0 |  |
| Modified starch |  | 20.0 |
| Water | 200.0 | 300.0 |

This impregnating-coating step is made to fill the under surface spaces of the sheet which have not been filled by the previous impregnation (step 2) and for this purpose solid pigments are present in the mixture. I also prefer starch as the adhesive for several reasons, one of which is that the starch filled sheet is whiter and remains whiter during subsequent vulcanizing oven treatment, and another reason is that the starch surface-filled sheet is apparently better adhered to by the lacquer.

This step gives the sheet a filled, close, surface, almost a coated surface, which calenders to a flat and glossy finish.

For the lacquering operation (step 4 above) I prefer to put on a lacquer coating produced by applying a solution containing:

Cellulosic compounds of the groups of

Cellulose esters
    Cellulose acetate, lacquer types
    Cellulose nitrate, lacquer types
    Cellulose nitroacetate
    Cellulose acetobutyrate, as "Hercose C"
    Cellulose tripropionate
    Cellulose acetostearate
Cellulose ethers
    Ethyl cellulose
    Benzyl cellulose Resins compatible with such cellulose esters and ethers, such as Certain modified alkyd resins, two such resins being obtainable under the trade-mark "Rezyl", i. e., "Rezyl 337-1", a solid, and "Rezyl 337-2", a liquid;
Vinyl resins, two such resins being obtainable under the trade-mark "Vinyloid", i. e., "Vinyloid A" and "Vinyloid H";
Acryl resins, one such resin being obtainable under the trade-mark "Acryloid", i. e., "Acryloid C-10";
Sulfonamide resins, two such resins being obtainable under the trade-mark "Santolite", i. e., "Santolite MH" and "Santolite MHP";

and mixtures of any of the above materials.

In fact, I have found that a finished coating which appears to adhere more strongly to the base sheet and yet is easily removed from tacky rubber mixes is provided by using mixtures of the above materials. For example, a coating of cellulose acetate, properly plasticized, has excellent properties so far as its ability to allow tacky rubber to be separated easily from it is concerned, and is usually satisfactory, but when used with certain types of tacky rubber mixes it is somewhat deficient in its adherence to the base sheet. A coating of cellulose nitrate adheres well to the base sheet, but tacky rubber separates from it with some difficulty; often the rubber, if in a thin sheet, is distorted in shape, which renders it unfit for many subsequent uses. Also cellulose nitrate coatings are apt to be discolored by light, heat and the conditions undergone during the curing operation. But a more satisfactory coating is obtained if a percentage of the cellulose acetate is replaced by cellulose nitrate, as examples given later show.

All of the above mentioned materials and types of materials may be used with tacky rubber. Each one alone, however, has certain disadvantages, with certain types of rubber mixes—either lack of proper adhesion to the base sheet; or too great adhesion to certain types of tacky rubber or discoloration by heat or the conditions in the curing oven; or too expensive at the present time; or not obtainable in quantity and quality at the present time. So I have found that the best results are obtained by using certain mixtures.

One or more of the above materials are dissolved in appropriate solvents or solvent mixtures. In general I have used those solvents which are especially adapted for cellulose acetate types of lacquers, and in the formulation of the solvent mixtures, as my coatings have been put on by dipping and squeeze rolls or by blades or both, I have used a rather larger amount of medium evaporating-rate solvents. The solvent mixture, as is well known, must be adapted to the method of coating and the method of drying used, in addition to the necessary adaptability to the ingredients of the lacquer. Examples of solvent mixtures are given later.

When using cellulosic compounds as the chief ingredients of the final coatings I have found it advisable to use one or more of the so-called plasticizers. They must be compatible with the esters, ethers and resins used and they should, for the best results, be actual solvents for them. Examples of plasticizers I have used are:

Di butyl phthalate
Di butyl tartrate
Di methyl phthalate
Di amyl phthalate
Ortho and para toluene ethyl sulfonamides, one such product being obtainable under the trade-mark "Santicizer", i. e., "Santicizer 8"
Methyl phthalyl ethyl glycollate, one such product being obtainable under the trade-mark "Santicizer", i. e., "Santicizer M-17".

Diluents, such as benzene, toluene, and alcohol, are used to balance the evaporating rates and for economy.

One of my preferred lacquer compositions is

*Formula I*

| | |
| --- | --- |
| Low or medium viscosity cellulose acetate | 8.0 |
| Alcohol | 4.0 |
| Ethylene dichloride | 24.0 |
| Toluene | 6.0 |
| Ethylene glycol monomethyl ether | 27.4 |
| Acetic acid ester of ethylene glycol monomethyl ether | 24.0 |
| Ethyl lactate | 1.6 |
| Modified alkyd resin, solid (e. g., "Rezyl 337—1") | 0.8 |
| Modified alkyd resin, liquid (e. g., "Rezyl 337—2") | 0.4 |
| Ortho and para toluene ethyl sulfonamides | 0.8 |
| Methyl phthalyl ethyl glycollate | 3.0 |
| | 100.0 |

100 pounds of this lacquer gives 13.0 pounds of coating of which about 61.5% is cellulose acetate, about 9.2% is resins, and about 29.9% is plasticizer.

Other preferred lacquer compositions are given:

Formula II

| | |
|---|---|
| Low or medium viscosity cellulose acetate | 7.0 |
| Acetone | 8.0 |
| Alcohol | 6.0 |
| Ethylene dichloride | 17.0 |
| Toluene | 6.0 |
| Ethylene glycol monomethyl ether | 26.0 |
| Acetic acid ester of ethylene glycol monomethyl ether | 22.1 |
| Ethyl lactate | 1.4 |
| Modified alkyd resin, solid (e. g., "Rezyl 337—1") | 0.7 |
| Modified alkyd resin, liquid (e. g., "Rezyl 337—2") | 0.4 |
| ½ second nitrocellulose | 1.0 |
| Di butyl phalate | 0.3 |
| Ortho and para toluene ethyl sulfonamides | 0.7 |
| Methyl phthalyl ethyl glycollate | 2.8 |
| | 100.0 |

100 pounds of this lacquer gives 12.9 pounds of coating of which about 54.3% is cellulose acetate, about 7.8% is nitrocellulose, about 8.5% is resins and about 29.5% is plasticizer.

Formula III

| | |
|---|---|
| Cellulose acetate | 7.0 |
| Acetone | 7.0 |
| Alcohol | 6.0 |
| Ethylene dichloride | 21.8 |
| Toluene | 6.0 |
| Ethylene glycol monomethyl ether | 25.0 |
| Acetic acid ester of ethylene glycol monomethyl ether | 20.0 |
| Ethyl lactate | 1.4 |
| Modified alkyd resin, solid (e. g., "Rezyl 337—1") | 0.7 |
| Modified alkyd resin, liquid (e. g., "Rezyl 337—2") | 0.4 |
| Cellulose nitroacetate | 1.0 |
| Ortho and para toluene ethyl sulfonamides | 0.7 |
| Methyl phthalyl ethyl glycollate | 3.0 |
| | 100.0 |

In Formulae I, II and III, in place of the cellulose esters, I may substitute other cellulose esters, cellulose acetobutyrate, cellulose tripropionate, cellulose acetostearate, and/or the cellulose ethers, and/or the resins, "Vinyloid A", "Vinyloid H", or "Acryloid C—10", with perhaps some slight changes in the resins and plasticizers and solvents and their percentages. In place of the alkyd resins, I may substitute other resins compatible with cellulose acetate, with perhaps some changes in the other resins, solvents and plasticizers and their percentages, or the omission of some. For example, the "Santolite" resins may, in some cases, be used in place of the "Rezyls" mentioned in the formulae. The formulae given are typical and illustrative only of the type of lacquers which will produce lacquered surfaces, in accordance with the present invention, fulfilling the conditions necessary for suitable use with tacky rubbers. The percentages given may be altered within wide limits without departing from the scope of the invention as the varieties of tacky rubber compositions vary to a high degree, but with the use of the types of materials mentioned, some one or more of them are suitable for all the varieties of tacky rubber compositions which I have been able to obtain. Some of the ingredients of usual nitrocellulose lacquers, such as ester gum, gum Dammar, etc., I have found not to be suitable, as such coatings are altered, either by discoloring or otherwise, when the tacky rubber is given the heat curing operation, or the separation from tacky rubber is impaired, or both. For the same reasons, the usually encountered nitrocellulose lacquers, containing ingredients (e. g., gums, resins, etc.) not compatible with cellulose acetate, are not suitable for the purposes of my invention. Waxes and like materials which melt at the temperature of the curing oven, likewise are not suitable as lacquer ingredients in the present connection, because they either discolor the carrying sheet or cause the coating to adhere too firmly to tacky rubber; they appear to be harmful generally in coatings for the purposes of this invention.

In general, the vinyl resins and "Acryloid" resins are equivalents of the cellulose esters and ethers in my lacquer compositions: they form viscous solutions which yield tough films like those from cellulose esters or ethers. The "Rezyl" and "Santolite" resins, on the other hand, form "thin" (i. e., materially less viscous) solutions which, at least in certain instances, yield clear though relatively weak films (as contrasted with lacquers having a base of cellulose ester or ether.)

In the appended claims, the expression "separably adherent to tacky rubber" is intended to mean sufficiently adherent to carry a sheet of rubber through processing operations, including ovening of the rubber if required, but not so adherent as to make difficult the separation of the rubber from the surfaced carrying sheet or to cause an impairment either of the surface of the rubber sheet or of the carrying sheet when so separated or to bring about material "picking" of the surfacing on the carrying sheet.

It is understood that while in Step 1 any strong pulp may be used whatever the process of cooking or preparation, or the color; and that while in Step 2 any adhesive, properly flexibilized or softened, as by glycerine or other flexibilizer or softener (such as triethanolamine, softeners of the sugar type, or any other); and that while in Step 3 any properly flexibilized adhesive may be used, when given an adherent lacquer coating as above described, the finished sheet will be useful with tacky rubber mixes, yet some pulps selected for Step 1 will turn yellow or brown during the oven curing heat treatment; and casein adhesive used in Steps 2 and 3, and certain flexibilizers used in these steps will discolor during long continued oven curing necessary with certain types of rubber mixes. Therefore, although such discolorizations of the sheet are not detrimental to the use of the so-prepared sheet yet in order to comply with the desire and custom of the rubber manufacturing trade it is desirable in Step 1 to select a pulp which will not discolor during the curing heat treatment and in Steps 2 and 3 to use grades of modified starch and flexibilizers which also will not discolor under such curing treatment. Tinting color as a corrective may be used where only slight yellowing of pulp or adhesive occurs. The formulae above given are illustrative of those which may be used and I do not limit myself to the exact formulae given but variations may be made so long as they come within the scope of the claims.

The split test to which I referred in giving split test values after Steps 2 and 3 above is practiced as follows: The split test machine carries two 1¼ inch wide rollers, one 3 inches in diameter, the other ⅝ inch in diameter. Both are mounted on horizontal bearings and each is free to turn easily. The centers of the two rollers are in the same horizontal plane and there is a space of 1/16 inch width between the circumferences of the two rollers. The 3 inch roll carries two clamps for holding paper strips. These clamps are close together on the circumference of the roll. A sheet of the paper to be tested is cut 12 inches long (in the machine direction) by several inches wide. A sheet of dense strong cloth such as friction tape, or a sheet of very strong paper, for example, vulcanized fiber paper, is cut to the same size for a backing sheet. The sheet to be tested is glued to the backing sheet over a surface beginning 5 inches from one end and extending about 4½ inches, which leaves unglued 5 inches at one end and 2½ inches at the other end. The combined pair of sheets is then cut into lengthwise strips ½ inch wide. It is important that the glue be a strong glue and dried, and that the line 5 inches from the upper end where gluing starts be at right angles to the strips and that it be a straight line and not irregular. The bottom of the double strip is passed down between the two rolls and carried around the 3 inch roll and clamped with the backing strip against the roll. The other end of the backing strip is then clamped also, so that the strip fits the 3 inch roll closely. The free end of the strip to be tested is then brought out over the small roll and attached to a horizontal pulling device operated by a crank. Set into this pulling device, between the place where the tested strip is attached and the crank, is a spring tension carrying a calibrated indicator which shows grams pull. When tension is applied by the crank the strip being tested pulls tightly over the ⅝ inch roll and finally a break occurs. The tested strip splits and the grams-pull is shown. This figure of grams-pull is for a strip ½ inch wide which is reduced to a corresponding figure 1 centimeter wide. The pull is executed at a constant rate. The result is an average of 5 or more individual pull tests.

This application contains subject matter in common with my application Serial No. 81,123, filed May 21, 1936.

I claim:

1. Process of adapting an unsized, unfilled, strong and tough paper web which has been formed from a strong stuff only moderately beaten and slightly hydrated, the paper web having a weight of the order of about 87 pounds per ream, for use in carrying, separating and protecting tacky rubber, which comprises saturating the paper web throughout, by impregnation, with an aqueous dispersion of organic adhesive and a flexibilizer for said adhesive, whereby the strength, toughness and split-resistance of the paper web are materially increased; imparting to both surfaces of the so-impregnated web, by a method involving calendering, an increased smoothness, surface flatness and firmness, and gloss; and applying to at least one of the so-treated and calendered surfaces of the paper web a coating of a lacquer composition whose base is selected from the group of tough film-forming lacquer bases consisting of plasticized organic esters of cellulose, plasticized cellulose ethers, vinyl resins and acryl resins, whereby to provide a gloss surface which is separably adherent to tacky rubber.

2. Process of adapting an unsized, unfilled, strong and tough paper web which has been formed from a strong stuff only moderately beaten and slightly hydrated, the paper web having a weight of the order of about 87 pounds per ream, for use in carrying, separating and protecting tacky rubber, which comprises saturating the paper web throughout, by impregnation, with an aqueous dispersion of organic adhesive and a flexibilizer for said adhesive, whereby the strength, toughness and split-resistance of the paper web are materially increased; imparting to both surfaces of the so-impregnated web an increased smoothness, surface flatness and firmness and gloss by surface-coating the same with a surface-coating composition comprising organic adhesive material and then super-calendering the so-coated surfaces; and applying to at least one of the so-treated and calendered surfaces of the paper web a coating of a lacquer composition whose base is selected from the group of tough film-forming lacquer bases consisting of plasticized organic esters of cellulose, plasticized cellulose ethers, vinyl resins and acryl resins, whereby to provide a gloss surface which is separably adherent to tacky rubber.

3. The process defined in claim 1, characterized in that the impregnating dispersion comprises casein.

4. The process defined in claim 1, characterized in that the impregnating dispersion comprises modified starch.

5. A paper product for carrying, separating and protecting tacky rubber, comprising an inherently strong and tough sheeted paper base having a weight of the order of about 87 pounds per ream, impregnated throughout with flexibilized organic adhesive, said paper product having both its surfaces densified and at least one surface being coated with a lacquer film which is separably adherent to tacky rubber, the base of said lacquer film comprising a film-forming lacquer base selected from the group consisting of plasticized organic esters of cellulose, plasticized cellulose ethers, vinyl resins and acryl resins, said paper product being produced by the process of claim 1.

6. A paper product for carrying, separating and protecting tacky rubber, comprising an inherently strong and tough sheeted paper base having a weight of the order of about 87 pounds per ream, impregnated throughout with flexibilized organic adhesive, said paper product being provided on both surfaces with a densified surface coating comprising an organic adhesive and at least one surface being overlaid with a lacquer film which is separably adherent to tacky rubber, the base of said lacquer film comprising a film-forming lacquer base selected from the group consisting of plasticized organic esters of cellulose, plasticized cellulose ethers, vinyl resins and acryl resins, said paper product being produced by the process of claim 2.

7. A paper product for carrying, separating and protecting tacky rubber, comprising an inherently strong and tough sheeted paper base having a Mullen test of at least about 85, impregnated throughout with flexibilized organic adhesive, said paper product having both its surfaces densified and at least one surface being coated with a lacquer film which is separably adherent to tacky rubber, the base of said lacquer film comprising a film-forming lacquer base selected from the group consisting of plasticized organic esters of cellulose, plasticized cellulose ethers, vinyl resins and acryl resins, said paper product being produced by the process of claim 1.

8. A paper product for carrying, separating and protecting tacky rubber, comprising an inherently strong and tough sheeted paper base having a Mullen test of at least about 85, impregnated throughout with flexibilized organic adhesive, said paper product having both its surfaces densified and at least one surface being coated with a lacquer film which is separably adherent to tacky rubber, the base of said lacquer film consisting essentially of acryl resin, said paper product being produced by the process of claim 1.

9. A paper product for carrying, separating and protecting tacky rubber, comprising an inherently strong and tough sheeted paper base having a Mullen test of at least about 85, impregnated throughout with flexibilized organic adhesive, said paper product having both its surfaces densified and at least one surface being coated with a lacquer film which is separably adherent to tacky rubber, the base of said lacquer film consisting essentially of vinyl resin, said paper product being produced by the process of claim 1.

GEORGE W. COGGESHALL.